(12) United States Patent
Guenther et al.

(10) Patent No.: US 7,449,529 B2
(45) Date of Patent: Nov. 11, 2008

(54) BIMODAL BLOW MOLDING RESIN AND PRODUCTS MADE THEREFROM

(75) Inventors: Gerhard Guenther, Kemah, TX (US); Curtis D. Clark, League City, TX (US)

(73) Assignee: Fina Technology, Inc., Houston, TX (US)

(*) Notice: Subject to any disclaimer, the term of this patent is extended or adjusted under 35 U.S.C. 154(b) by 0 days.

(21) Appl. No.: 11/774,311

(22) Filed: Jul. 6, 2007

(65) Prior Publication Data

US 2008/0015318 A1    Jan. 17, 2008

Related U.S. Application Data

(60) Provisional application No. 60/830,034, filed on Jul. 11, 2006.

(51) Int. Cl.
    C08F 4/42          (2006.01)
(52) U.S. Cl. .................... 526/128; 516/348; 516/124.3; 516/125.1; 516/125.2
(58) Field of Classification Search .............. 526/348, 526/124.3, 125.1, 125.2, 128
    See application file for complete search history.

(56) References Cited

U.S. PATENT DOCUMENTS

| | | | |
|---|---|---|---|
| 4,255,544 A | 3/1981 | Kimura et al. | |
| 4,271,060 A | 6/1981 | Hubby | |
| 4,543,399 A | 9/1985 | Jenkins et al. | |
| 4,588,790 A | 5/1986 | Jenkins et al. | |
| 5,001,205 A | 3/1991 | Hoel | |
| 5,028,670 A | 7/1991 | Chinh et al. | |
| 5,236,998 A | 8/1993 | Lundeen | |
| 5,317,036 A | 5/1994 | Brady et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 6,147,173 A | 11/2000 | Holtcamp | |
| 6,174,971 B1 * | 1/2001 | Chen et al. ............... | 526/125.3 |
| 6,180,735 B1 | 1/2001 | Wenzel | |
| 6,194,520 B1 | 2/2001 | Cheruvu et al. | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agaplou et al. | |
| 6,359,072 B1 | 3/2002 | Whaley | |
| 6,380,328 B1 | 4/2002 | McConville et al. | |
| 6,420,580 B1 | 7/2002 | Holtcamp | |
| 6,713,561 B1 | 3/2004 | Berthhold et al. | |
| 6,734,134 B1 * | 5/2004 | Gray et al. ................ | 502/132 |
| 7,037,977 B2 | 5/2006 | Miserque et al. | |
| 2005/0154159 A1 | 7/2005 | DesLauriers et al. | |

OTHER PUBLICATIONS

Kirk-Othmer, Encyclopedia of Chemical Technology, vol. 17, 4th Edition, pp. 735-737 (1996).
Equistar, A Lyondell Chemical Company, Alathon L5040 High Density Polyethylene Blow Molding/Extrusion Grade.
Equistar, A Lyondell Chemical Company, Alathon L5440 High Density Polyethylene Blow Molding Grade.
Equistar, A Lyondell Chemical Company, Alathon L5840 High Density Polyethylene Blow Molding/Extrusion Grade.

* cited by examiner

*Primary Examiner*—Ling-Siu Choi
(74) *Attorney, Agent, or Firm*—Tenley R. Krueger

(57) ABSTRACT

A polymer, and a process of producing the polymer, that comprises at least one olefin and has an ESCR of 100 hours to 500 hours, a density of 0.955 g/cc to 0.959 g/cc, and a flexural modulus of 140,000 psi to 220,000 psi. An article of manufacture that comprises the polymer.

11 Claims, 1 Drawing Sheet

US 7,449,529 B2

BIMODAL BLOW MOLDING RESIN AND PRODUCTS MADE THEREFROM

PRIORITY CLAIM AND CROSS-REFERENCE TO RELATED APPLICATIONS

This Application claims the benefit of U.S. Provisional Patent Application No. 60/830,034, filed Jul. 11, 2006. This Application cross-references U.S. patent application Ser. No. 11/774,289, filed Jul. 6, 2007, which claims the benefit of U.S. Provisional Patent Application No. 60/830,016, filed Jul. 11, 2006, both of which are fully incorporated by reference herein; and U.S. patent application Ser. No. 11/774,255, filed Jul. 6, 2007, which claims the benefit of U.S. Provisional Patent Application No. 60/830,173, filed Jul. 11, 2006, both of which are fully incorporated by reference herein.

FIELD

Embodiments of the present invention relate generally to polymeric resins and to end-use products made from such polymeric resins. More particularly, the present invention relates to bimodal polyolefins made from Ziegler-Natta catalysts having certain desirable physical properties and the end-use products having certain desirable physical properties, derived from such bimodal polyolefins.

BACKGROUND

Polyethylene has been used in the production of various blow molded products, such as bottles and containers. Examples of such products include consumer/household containers, such as detergent bottles, shampoo bottles, bleach bottles, and the like; industrial containers, such as carry cases for hardware/tools, containers for agricultural chemicals, photochemicals, and institutional food products; and industrial parts, such as stadium seating.

Blow molding is accomplished by extruding molten polyethylene resin as a parison or hollow tube into a mold cavity while simultaneously forcing air into the parison so that the parison expands, taking on the shape of the mold. The molten polyethylene cools within the mold until it solidifies to produce the desired molded product.

The blow molded products made from polyethylene, polyethylene blends or coextruded structures of polyethylene or polyethylene blends offer relatively good strength and other performance properties. It is desirable that the final polyethylene or polyethylene blend product exhibits good physical properties such as good drop impact, stiffness, and good Environmental Stress Crack Resistance (ESCR).

Therefore, it is desirable to develop a polyethylene resin and blow molded products that are lightweight and have a balance of performance properties, such as drop impact, stiffness, and ESCR.

SUMMARY

In one embodiment, the present invention includes a polymer comprising at least one olefin and having an ESCR of 100 hours to 500 hours, a density of 0.955 g/cc to 0.959 g/cc, and a flexural modulus of 140,000 psi to 220,000 psi.

In one embodiment, the present invention includes a process for producing a polymer, said process comprising: (a) contacting one or more olefin monomers together in the presence of a catalyst under polymerization conditions, wherein said catalyst is produced by a process comprising: (i) contacting an alkyl magnesium compound with an alcohol to form a magnesium dialkoxide compound; (ii) contacting said magnesium dialkoxide compound with a first agent to form a reaction product "A"; (iii) contacting said reaction product "A" with a second agent to form reaction product "B"; (iv) contacting said reaction product "B" with a third agent to form reaction product "C"; (v) contacting said reaction product "C" with a fourth agent to form reaction product "D"; and (vi) contacting said reaction product "D" with a fifth agent to form said catalyst; and (b) extracting said polymer.

DETAILED DESCRIPTION

Introduction and Definitions

Figure 1:
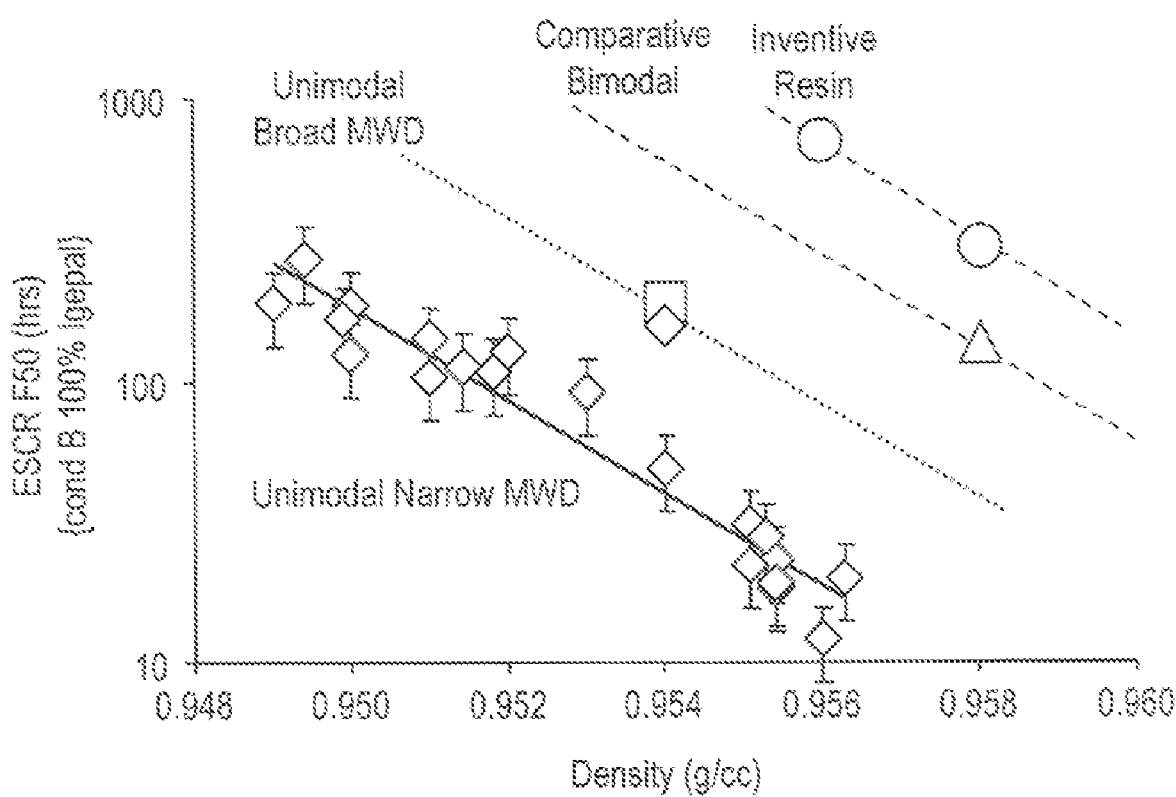
FIG. 1 illustrates the ESCR of one embodiment of the inventive resin relative to comparative resins.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "density" is measured via ASTM-D-792.

As used herein, "melt flow index" is measured via ASTM-D-1238-01 (Method A—Cut and Weigh).

As used herein, "Environmental Stress Crack Resistance (ESCR) for resin" is measured via ASTM-D-1693, Condition B.

As used herein, "flexural modulus" is measured via ASTM-D-790, and may be referred to as "stiffness".

The term "equivalent" refers to a molar ratio of two components.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, "bimodal" refers to a polymerization process for producing a bimodal resin having a distinct low molecular weight portion and a distinct high molecular weight portion.

As used herein, "copolymer" refers to any polymeric material comprising two or more different monomers.

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^4_x;$$

wherein M is a transition metal, $R^4$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^4$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl), tri-n-octylaluminum (TNOAl), and triisobutyl aluminum (TIBAl), for example.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

Prior efforts to form the Ziegler-Natta catalyst generally included the methods described below. (See, U.S. Pat. No. 6,734,134 and U.S. Pat No. 6,174,971, which are incorporated by reference herein.)

A representative, non-limiting, illustration of a possible reaction scheme may be illustrated as follows:
1) $MgR^1R^2 + 2 R^3OH \rightarrow Mg(OR^3)_2$
2) $Mg(OR^3)_2 + ClA(O_xR^4)_y \rightarrow$ "A"
3) "A" + $TiCl_4/Ti(OR^5)_4 \rightarrow$ "B"
4) "B" + $TiCl_4 \rightarrow$ "C"
5) "C" + $TiCl_4 \rightarrow$ "D"
6) "D" + $AR^6_3 \rightarrow$ Catalyst Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention. For example, the third and fourth agents may be added to reaction product B at the same time to form reaction product D.

Such methods generally include contacting an alkyl magnesium compound with an alcohol to form a magnesium dialkoxide compound. Such reaction may occur at a reaction temperature ranging from room temperature to about 90° C. for a time of up to about 10 hours, for example.

The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example.

The method then includes contacting the magnesium dialkoxide compound with a first agent, or halogenating agent, to form reaction product "A".

Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

$$ClA(O_xR^4)_y;$$

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide ($ClTi(O^iPr)_3$) and $ClSi(Me)_3$, for example.

The method then includes contacting reaction product "A" with a second agent, or halogenating/titanating agent to form reaction product "B".

Such reaction may occur in the presence of an inert solvent. The inert solvents may include any of those solvents previously discussed herein, for example.

The reaction may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

$$TiCl_4/Ti(OR^5)_4;$$

wherein $R^5$ is selected from $C_2$ to $C_{20}$ alkyl groups. Non-limiting illustrations of second agents include blends of titanium chloride and titanium alkoxides, such as $TiCl_4/Ti(OBu)_4$. The blends may have an equivalent of $TiCl_4:Ti(OR^5)_4$ of from about 0.5 to about 6 or from about 2 to about 3, for example.

The method may then include contacting reaction product "B" with a third agent, or halogenating/titanating agent to form reaction product "C".

Such reaction may occur in the presence of an inert solvent. The inert solvents may include any of those solvents previously discussed herein, for example.

The reaction may further occur at room temperature, for example.

The third agent may be added to the reaction product "B" in an equivalent of from about 0.1 to about 5, or from about 0.25 to about 4 or from about 0.45 to about 4.5, for example.

Non-limiting illustrations of third agents include metal halides. The metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 4.5, for example.

The method may further include contacting reaction product "C" with a fourth agent, or halogenating/titanating agent, to form reaction product "D".

Such reaction may occur in the presence of an inert solvent. The inert solvents may include any of those solvents previously discussed herein, for example.

The reaction may further occur at room temperature, for example.

The fourth agent may be added to the reaction product "C" in an equivalent of from about 0.1 to about 5, or from about 0.25 to about 4 or from about 0.45 to about 4.5, for example.

Non-limiting illustrations of fourth agents include metal halides. The metal halides may include any metal halide previously described herein.

The method may then include contacting reaction product "D" with a fifth agent to form the catalyst component.

The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^6_3;$$

wherein $R^6$ is a $C_1$ to $C_{10}$ alkyl compound. Non-limiting illustrations of the aluminum alkyl compounds generally include trimethyl alumimum (TMA), triisobutyl aluminum (TIBAl), triethyl aluminum (TEAl), tri-n-octylaluminum (TNOAl), n-octyl aluminum and n-hexyl aluminum, for example.

As illustrated above, the first agent and the second agent generally include blends of compounds. In addition, the a plurality of first agents or second agents may be used and still retain one or more of the beneficial properties obtained via blends. Further, a magnesium metal may be used in place of the alkyl magnesium compounds. (See for example U.S. patent application Ser. No. 11/474,145, filed Jun. 23, 2006, entitled Formation of Ziegler-Natta Catalyst, which is fully incorporated by reference herein).

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30°

C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst and optionally a co-catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In one embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

In one embodiment, a slurry process using continuous stirred tank reactors, such as the Hoechst process (see Kirk-Othmer, Encyclopedia of Chemical Technology, Volume 17, 4$^{th}$ Edition, pages 735-737 (1996), which is herein incorporated by reference), may be carried out. Hexane is used as the diluent. The reactors may be operated at 75° C. to 95° C. and a total pressure of 1 atm to 12.5 atm. Ethylene comonomer, solvent, catalyst components, and hydrogen are continuously fed into the reactor. Residence time of the catalyst is from 1 to 6 hours. Optionally, hydrogen may be added to the process, such as for molecular weight control of the resultant polymer. Optionally, other monomers, such as butene, may also be added to the process.

In one embodiment, ethylene is polymerized in the presence of a Ziegler-Natta catalyst at elevated temperature and pressure. Polymerization is carried out in a series of polymerization reactors selected from the group of slurry reactors. In one embodiment, the reactor system comprises two continuously stirred tank reactors (CSTR). The reactor system can comprise the reactors in any number and order, and it is also possible to conduct the process in single or multiple loop reactors.

Additionally, there may be included with the polymerization reactors, prereactors, which include any reactor for pre-polymerizing the catalyst and for modifying the olefinic feed, if necessary. All reactors may be arranged in series.

The high molecular weight portion and the low or medium molecular weight portion of the resulting bimodal polymer, can be prepared in any order in the reactors, i.e., the low molecular weight portion in the first reactor and the high molecular weight portion in the second reactor, or vise versa. The conditions of the reactor are selected such that 30 wt. % to 70 wt. %, or 40 wt. % to 60 wt. %, or 50 wt. % of the final product is made in one reactor, with the remaining product being formed in the second reactor.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene (LLDPE), elastomers, plastomers, high density polyethylenes, low density polyethylenes (LDPE), medium density polyethylenes (MDPE), bimodal polyethylenes, and polyethylene copolymers for example. The blends may further include post consumer recycle (PCR).

In one embodiment, ethylene based polymers may have a density of from about 0.945 g/cc to about 0.962 g/cc, or from about 0.955 g/cc to about 0.960 g/cc, or from about 0.957 g/cc to about 0.959 g/cc, for example.

Such ethylene based polymers may have a molecular weight distribution of at least 20 or at least 15 or at least 10, for example.

In one embodiment, the ethylene based polymers may have a flexural modulus, or stiffness, of 220,000 psi; 200,000 psi; 180,000 psi; 160,000 psi; or 140,000 psi; for example.

In one embodiment, the ethylene based polymers may have an ESCR, based on ASTM-D1693, condition B, of about 50 to about 1,000 hours, or about 100 to about 500 hours, or about 200 to about 400 hours.

In one embodiment, the ethylene based polymers may have a melt flow index (MFI) of from about 0.1 dg/min to about 1.0 dg/min., or from about 0.25 dg/min. to about 0.75 dg/min., or from about 0.40 dg/min. to about 0.50 dg/min., for example.

In one embodiment, the ethylene based polymers may have a melt index ratio $I_{21}$ of at least from 50 to 100, at least from 60 to 90, or at least from 70 to 80, for example.

Product Application

The polymers and blends thereof are useful in applications known to one skilled in the art, such as forming operations (e.g., film, sheet, pipe and fiber extrusion and co-extrusion as well as blow molding, injection molding and rotational molding). Films include blown or cast films formed by co-extrusion or by lamination useful as shrink film, cling film, stretch film, sealing films, oriented films, snack packaging, heavy duty shipping sacks, grocery sacks, baked and frozen food packaging, medical packaging, industrial liners, and membranes, for example, in food-contact and non-food contact application. Fibers include melt spinning, solution spinning and melt blown fiber operations for use in woven or nonwoven form to make filters, diaper fabrics, medical garments and geotextiles, for example. Extruded articles include medical tubing, wire and cable coatings, geomembranes and pond liners, for example. Molded articles include single and multilayered constructions in the form of bottles, tanks, large hollow articles, rigid food containers and toys, industrial parts, such as, but not limited to, carry cases for hardware (e.g. saws, tools, etc.) and stadium seating, industrial containers, such as, but not limited to, jerry cans for agriculture chemicals, photochemicals, and institutional food products (e.g. oils, ketchup, etc.), and consumer containers, such as, but not limited to, detergent bottles (handleware and non-handleware), personal care bottles (shampoo, cosmetics, etc.), and skin care bottles, for example.

The molded articles may be coextruded structures of polyethylene or polyethylene blends. The coextruded article may comprise, for example, a metallocene MDPE, metallocene LLDPE, LLDPE, LDPE, or combinations thereof, including blends. The polymers and blends of the present invention may comprise the skin layer, core layer or multiple layers of a coextruded structure or article. The polymers and blends of the present invention may further comprise PCR. The articles or coextruded structures of the present invention may also comprise PCR.

In one embodiment, the molded articles may be formed by blow molding on a Continuous Extrusion Blow Molder available from Bekum, Uniloy, Automa, Jomar, Graham Engineering, Wilmington, et al.

EXAMPLES

The invention having been generally described, the following examples are provided merely to illustrate certain embodiments of the invention, and to demonstrate the practice and advantages thereof. It is understood that the examples are given by way of illustration and are not intended to limit the scope of the specification or the claims in any manner.

Certain Test Methods were used in determining the physical properties of the resin and the end-use products. Those Test Methods are listed below and are readily available to those of ordinary skill in the art.

Tests run on the resin included melt index using ASTM D1238 (A), density using ASTM D792, flexural modulus (a calculation of stiffness) using ASTM D790, and ESCR using ASTM-D1693, condition B.

In the following examples, the Ziegler-Natta catalyst compounds were prepared in a 500 mL reactor equipped with four Morten's indentions and a dropping funnel, three-blade agitator and septa.

As used herein, "BEM" refers to 20.2 wt. % solution of butylethylmagnesium (0.12 wt. % Al).

As used herein, "EHOH" refers to 2-ethylhexanol.

As used herein, "TNBT" refers to tetra n-butyl titanate.

As used herein, "TEAl" refers to triethyl aluminum.

The preparation of the catalyst was achieved by slurrying 100 mmol (54.7 g) of BEM in hexane (total volume 100 ml) and stirring (250 rpm) the mixture at room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (45 g) of ClTi(O$^i$Pr)$_3$ (2M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT were added to a 250 mL graduated cylinder. 200 mmol (37.04 g) of TiCl$_4$ was then added dropwise to the TNBT mixture at room temperature over 30 minutes to form 2TiCl$_4$/(OBu)$_4$. Hexane was then added to the mixture to provide a mixture volume of 250 mL. The resulting mixture was then allowed to set over 2 hours.

The preparation then included adding the 2TiCl$_4$/Ti(OBu)$_4$ dropwise to the reaction mixture "A" at room temperature over 2 hours to form reaction mixture "B". The reaction mixture "B" was then stirred at room temperature for another hour. The reaction mixture "B" was then decanted and the resulting solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 12 g. A person of ordinary skill in the art can adequately scale the catalyst preparation for any process. The catalyst was then diluted to an appropriate concentration for continuous feeding to maintain a desired production rate.

A plant having two CSTRs in series was operated as follows: the first reactor was operated at 186° F. (85° C.) and 125 psig (8.6 bar). Ethylene, hydrogen, and hexane were continuously introduced into the reactor, together with the polymerization catalyst ($5.5 \times 10^{-3}$ wt. % based on hexane) and cocatalyst (TNOAl) ($1.1 \times 10^{-1}$ wt. % based on hexane). Reactor conditions were such that polymer having properties according to Table 1 was produced. The polymer was introduced into the second reactor, operated at 178° F. (81° C.) and 63 psig (4.3 bar). Additional ethylene was added, along with butene comonomer. Reactor conditions and polymer withdrawal rate were such that materials according to Table 1 were obtained. The reactor conditions in both reactors were such that 51.3% conversion of ethylene was obtained in the first reactor, 48.7% conversion of ethylene was obtained in the second reactor, and an MI$_5$ of 400 dg/min was obtained in the first reactor. MI$_2$ is for 2.16 kg weight used in test and MI$_5$ is for 5 kg weight used in test. These properties were determined using the standard ASTM melt index tests.

Table 1 contains the production conditions and product properties of the resultant polymer.

TABLE 1

Production Conditions and Product Properties

| Condition/Property | Example 1 |
|---|---|
| Reactor One Temperature (° F.) | 186 |
| Reactor One Pressure (psig) | 125 |
| Reactor One MI$_5$ (dg/min) | 446 |
| Reactor Two Temperature (° F.) | 178 |
| Reactor Two Pressure (psig) | 63 |
| Reactor Two MI$_2$ (dg/min) | 0.83 |
| Pellet MI$_2$ (dg/min) | 0.44 |
| Butene (lbs butene/lbs C$_2$) | 0.023 |
| Powder Density (g/cc) | 0.955 |
| Pellet Density (g/cc) | 0.956 |

The polymers produced were tested for physical properties. Table 2 contains those properties. FIG. 1 demonstrates the ESCR of the inventive resins with respect to density in comparison with other commercially available resins, including unimodal broad molecular weight distribution resins, unimodal narrow molecular weight distribution resins, and a comparative bimodal resin. The comparative bimodal resin was Equistar L5840, available from Equistar. The polymers of the present invention show increased ESCR for a given density.

TABLE 2

ESCR for Resins for the Inventive Resin & Other Resins

|  | Density (g/cc) | ESCR F-50 (hrs) |
|---|---|---|
| Unimodal Narrow MWD Resin | 0.955 | 31 |
|  | 0.952 | 127 |
|  | 0.950 | 124 |
|  | 0.951 | 140 |
|  | 0.951 | 103 |
|  | 0.950 | 185 |
|  | 0.949 | 188 |
|  | 0.951 | 112 |
|  | 0.952 | 108 |
|  | 0.950 | 166 |
|  | 0.949 | 269 |
|  | 0.953 | 91 |
|  | 0.955 | 23 |
|  | 0.955 | 18 |
|  | 0.955 | 19 |
|  | 0.956 | 12 |
|  | 0.954 | 49 |
|  | 0.956 | 20 |
|  | 0.955 | 22 |
|  | 0.955 | 28 |
| Unimodal Broad MWD Resin | 0.954 | 157 |
|  | 0.954 | 190 |
| Comparative Bimodal Resin | 0.958 | 135 |
| Inventive Resin | 0.956 | 700 |
|  | 0.958 | 300 |

While the foregoing is directed to embodiments of the present invention, other and further embodiments of the invention may be devised without departing from the basic scope thereof and the scope thereof is determined by the claims that follow.

What is claimed is:

1. An article of manufacture comprising polymer produced by a process comprising:
   a. contacting one or more olefin monomers together in the presence of a catalyst under polymerization conditions, wherein said catalyst is produced by a process comprising:
      i. contacting an alkyl magnesium compound with an alcohol to form a magnesium dialkoxide compound;
      ii. contacting said magnesium dialkoxide compound with a first agent to form a reaction product "A", wherein said first agent is selected from $ClTi(O^iPr)_3$, $ClSi(Me)_3$ and combinations thereof;
      iii. contacting said reaction product "A" with a second agent to form reaction product "B", wherein said second agent is $TiCl_4/Ti(OBu)_4$;
      iv. contacting said reaction product "B" with a third agent to form reaction product "C", wherein said third agent is $TiCl_4$;
      v. contacting said reaction product "C" with a fourth agent to form reaction product "D", wherein said fourth agent is $TiCl_4$; and
      vi. contacting said reaction product "D" with a fifth agent to form said catalyst; and
   b. extracting said polymer, wherein said polymer is bimodal and has a molecular weight distribution of at least 10.

2. The article of manufacture of claim 1 wherein said alkyl magnesium compound is selected from butyl ethyl magnesium, diethyl magnesium, dipropyl magnesium, dibutyl magnesium and combinations thereof.

3. The article of manufacture of claim 1 wherein said alcohol contacts said alkyl magnesium compound in an equivalent of from 0.5 to 6.

4. The article of manufacture of claim 1 wherein said alcohol is selected from butanol, isobutanol, 2-ethylhexanol and combinations thereof.

5. The article of manufacture of claim 1 wherein said fifth agent is selected from TMA, TIBAl, TEAl, n-octyl aluminum, n-hexyl aluminum and combinations thereof.

6. The article of manufacture of claim 1 wherein said article is selected from industrial parts, industrial containers, and consumer containers.

7. The article of manufacture of claim 6 wherein said article is a carry case.

8. The article of manufacture of claim 6 wherein said article is stadium seating.

9. The article of manufacture of claim 6 wherein said article is jerry cans for agriculture chemicals, photochemicals, and institutional food products.

10. The article of manufacture of claim 6 wherein said article is detergent bottles, personal care bottles, and skin care bottles.

11. The article of manufacture of claim 1 wherein said polymer is polyethylene.

* * * * *